United States Patent [19]

Säger et al.

[11] Patent Number: 6,037,765

[45] Date of Patent: Mar. 14, 2000

[54] METHOD AND SYSTEM FOR DETERMINATION OF SPEED OF REVOLUTION OF A ROTATING PART BY PERIODIC RECORDATION OF DETECTED SIGNALS ASSOCIATED WITH ANY ONE OF A PLURALITY OF DISCONTINUITIES ON THE PART

[75] Inventors: Peter Säger, Friedrichsdorf; Thomas Landsiedel, Steinbach, both of Germany

[73] Assignee: Mannesmann VDO AG, Frankfurt, Germany

[21] Appl. No.: 08/985,110

[22] Filed: Dec. 4, 1997

[30] Foreign Application Priority Data

Dec. 20, 1996 [DE] Germany ............................ 196 53 259
Nov. 7, 1997 [DE] Germany ............................ 197 49 307

[51] Int. Cl.[7] ................................................. G01P 3/481
[52] U.S. Cl. .......................... 324/166; 324/161; 702/148
[58] Field of Search ..................................... 324/160, 161, 324/166; 702/148, 149; 361/240, 242; 377/24, 24.1; 303/138

[56] References Cited

U.S. PATENT DOCUMENTS

| 3,500,375 | 3/1970 | Klimo | 324/161 X |
| 4,006,417 | 2/1977 | Pace | 324/166 |
| 4,071,282 | 1/1978 | Callahan et al. | 324/166 X |
| 4,529,932 | 7/1985 | Doueihi et al. | 324/161 |
| 5,231,597 | 7/1993 | Komatsu | 324/166 X |
| 5,487,009 | 1/1996 | Hill | 702/148 X |
| 5,569,848 | 10/1996 | Sharp | 702/148 X |

*Primary Examiner*—Gerard Strecker
*Attorney, Agent, or Firm*—Martin A. Farber

[57] ABSTRACT

A method for the exact determination of the speed of a rotating part, in particular the speed of the wheel of a motor vehicle, in which discontinuities present on the circumference of the rotating part are scanned without contact, an electric pulse being produced upon the detection of each discontinuity and the number of pulses thus produced being counted. In order definitely to be able to determine the dynamism of a rotating part without manufacturing tolerances of the incremental disks influencing this, the period of time within which all pulses of the rotating part are counted precisely once is determined, and the speed of the rotating part is determined therefrom.

10 Claims, 2 Drawing Sheets

METHOD AND SYSTEM FOR DETERMINATION OF SPEED OF REVOLUTION OF A ROTATING PART BY PERIODIC RECORDATION OF DETECTED SIGNALS ASSOCIATED WITH ANY ONE OF A PLURALITY OF DISCONTINUITIES ON THE PART

FIELD AND BACKGROUND OF THE INVENTION

The present invention relates to a method for the exact determination of the speed of a rotating part, in particular the speed of the wheel of a motor vehicle, in which discontinuities present on the circumference of the rotating part are scanned without contact and, upon the detection of a discontinuity, an electric pulse is produced and the number of pulses so produced is counted, the invention relating also to a system for carrying out the method.

Known systems for detecting the speed of motor vehicles utilize a signal which is supplied by a single speed transmitter for the determination of the speed of the vehicle.

For this purpose, incremental disks are provided on the front wheel of the motor vehicle. The speed transmitter, for instance a Hall sensor or an inductive transmitter, is arranged facing a wheel of the vehicle or facing the drive shaft of the wheel, or on the transmission output of the drive shaft, preferably on the left front wheel, and detects the speed of rotation of that wheel.

The speed of rotation of the wheel is calculated from the signal of the speed transmitter by counting the signal flanks during a predetermined period of time. This electric signal, which corresponds to the speed of rotation of the wheel, is fed to a controller which determines the speed of the vehicle from the signal.

Due to manufacturing tolerances on the wheel flanks of the increment transmitters with respect to each other and the occurrence of ovalization of the wheels or rims, there result, with this type of evaluation of the wheel speeds of rotation, peaks in the wheel speeds which lead to inaccuracies and falsify the actual wheel speed. These peaks are normally eliminated by filtering the signal.

If the wheel speeds are filtered excessively by the above-described method, the wheel speed determined in this manner loses dynamism.

SUMMARY OF THE INVENTION

The object of the present invention is thus to provide a method for the accurate determination of the speed of a rotating part in which manufacturing tolerances of the increment disk and out-of-true places of the part are eliminated and nevertheless the dynamism of the rotating part can be dependably determined.

In accordance with the invention, a period of time is determined within which the pulses of all out-of-true places of the rotating part are counted precisely once and the speed of the wheel determined therefrom.

The speed of the wheel is advantageously thus determined from the time for a complete revolution of the wheel, as a result of which the measurement does not contain manufacturing tolerances or ovalizations.

Despite the elimination of manufacturing tolerances and ovalizations of the structural part, a signal which is sufficiently dynamic is thus obtained.

In one embodiment, the pulses representing the discontinuities are divided into groups and, upon the occurrence of the first pulse of each group, a new measurement time is started by counting the pulses over all discontinuities. In this connection, the pulses representing the discontinuities are combined into groups of the same number.

This permits faster recognition of the speed, particularly in the case of low speeds. Furthermore, changes in the speed are in this way detected faster and more reliably.

As a further development, after the occurrence of the pulse of the first discontinuity of each group, time information is stored, and after the repeated occurrence of the pulse of this first discontinuity of each group, second time information is determined which is compared with the first time information, and the difference between the two time values is used to determine the speed of the rotating part. In this connection, upon the occurrence of the second time information, the first time information is erased and the second time information stored.

In this way, only that time information of interest at the moment is stored, so that less storage capacity is thus needed.

In a system for the carrying out of the method, an incremental transmitter is associated with each of at least two wheels of a motor vehicle. Opposite respective ones of the incremental transmitters are arranged signal sensors, which sensors detect the signal corresponding in each case to the speed of a wheel of the vehicle. These sensors are connected to a control device, and the control device has a memory with several registers which can be controlled by the signal of a counter.

In one embodiment, an incremental transmitter is arranged on each wheel of the vehicle, opposite each of which incremental transmitters there is arranged a sensor which is connected with the control device, and, from signals of all the transmitters, the control device determines the travel corridor for a predetermined period of time.

The determination of the wheel speeds on each wheel of the motor vehicle is particularly important for the prediction of travel around curves.

The invention permits of numerous embodiments.

BRIEF DESCRIPTION OF THE DRAWINGS

With the above and other objects and other advantages in view, the present invention will become more clearly understood in connection with the detailed description of a preferred embodiment, when considered with the accompanying drawings of which.

In the drawing.

DETAILED DESCRIPTION OF THE PREFERRED EMBODIMENT

Figure 1:
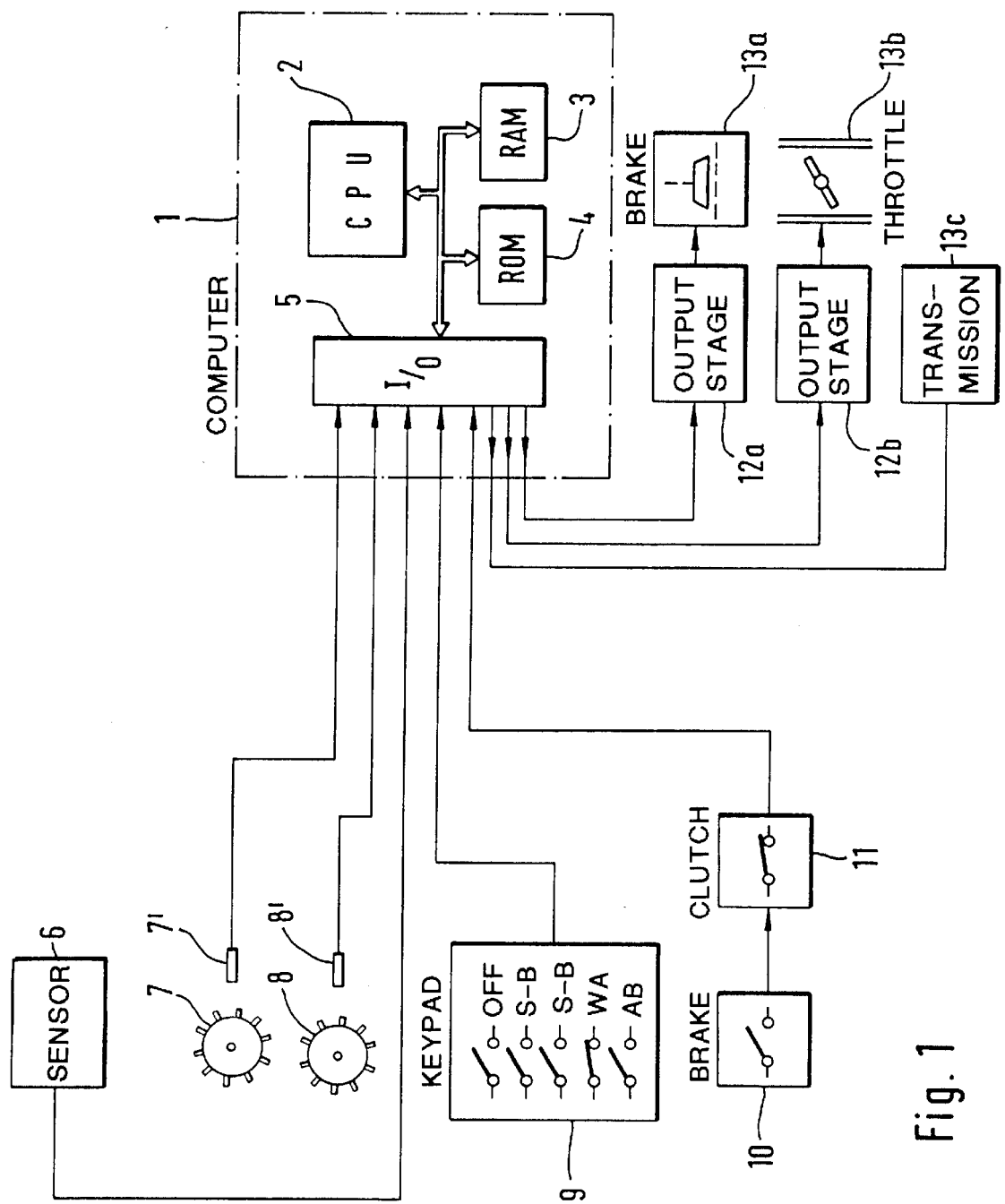
FIG. 1 shows an arrangement for determining the wheel speed of a motor vehicle.

FIG. 1 shows an automatic speed and distance control system for maintaining the safe distance of vehicles from one another, this system being arranged on the bumper of the car. A powerful microcomputer 1, consisting of a central processing unit 2, a random-access memory 3, a read-only memory 4, and an input/output unit 5, receives from a radar or laser sensor 6 a signal which measures the information concerning the distance behind at least one vehicle which is ahead of it.

Incremental disks 7 and 8 are arranged on the two front wheels (not shown) of the motor vehicle, and are scanned with respect to the speed of rotation by wheel sensors 7', 8' which are arranged opposite the incremental disks 7 and 8. These speed signals are also fed via an input and output unit 5 to the microcomputer 1. The wheel sensors can be inductive transmitters or Hall sensors.

From the signals delivered by the radar sensor 6 (distance-apart signal and relative-speed signal) and by means of the wheel speeds, the microprocessor 1 calculates the difference in speed between two vehicles and from this determines the safe minimum distance apart. If this distance is dropped below, the signal warns the driver if the warning function is activated.

If the distance-apart calculation is turned on by the driver, then the distance to the car in front is automatically set at a selectable distance. By the depressing of a key on the keypad 9, a desired speed and/or the desired distance is set and stored, and maintained by the system.

Upon approaching a slower car, the microcomputer 1, by automatically closing the throttle valve 13b, effects a decrease in the speed of the vehicle and in this way adjusts the desired distance from the preceding car set. Thereby the desired distance away is always greater than or equal to the safe distance prescribed by the law. In addition to the automatic closing of the throttle valve 13b, action on the brake 13a and/or control of the automatic transmission 13c is possible so as to reduce the speed of travel. If the road ahead is again free, the distance-apart controller accelerates the vehicle to the maximum speed set. The distance control is always active upon the passing of a car.

Furthermore, the microcomputer 1 is connected by switches to the vehicle brake 10 and/or the vehicle clutch 11. If they are actuated by the driver via the clutch pedal or the brake pedal, they disconnect the control in normal operation.

In the microcomputer, a closed-loop circuit forms a comparison between a desired value and the actual value of a control concept contained in software. If one is within the control range, then an output signal determined by the control item is given off by the microcomputer. The throttle valve 13b, the brake 13a, and/or the transmission 13c are controlled via an electric output stage 12a, 12b.

From the speed signals detected by the speed sensors 7', 8', the means formed in the microcomputer 1 for determining the travel corridor determines the yaw rate $\phi$ of the vehicle. The yaw is determined as follows:

$$\dot{\phi} = \Delta V_{FW}/(S + V^2 \times k)$$

wherein $\Delta V_{FW}$ is the difference in speed between the front wheels of the vehicle, S is the width of the tread between the front wheels, V is the speed of travel, k is the dynamic correction factor.

With the aid of the yaw determined in this way, the track of the vehicle is now calculated from the curve radius $R = V_W/\phi$.

The radius moved over by each front wheel is determined from the wheel speed $V_W$ of this front wheel divided by the yaw $\phi$.

The travel corridor is formed as a function of the radii $R_R$ and $R_L$ of the right and left front wheels. The width of the travel corridor is equal to at least the track of the wheels.

The determination of the speed of the vehicle on the basis of the detection of the wheel speed will now be explained:

The increment disks 7 and 8 which are connected to the respective front wheels of the motor vehicle have, for instance, an even number of discontinuities. Upon the rotation of the incremental disk 7 or 8, the discontinuities move past the Hall sensor 7' and 8' respectively at a predetermined distance from it in such a manner that the magnetic flux between the disk 7 or 8 and the sensor 7' or 8' respectively is changed. The output signal of each Hall sensor 7' or 8' is a series of pulses, and the front flanks or rear flanks of the pulses are counted. The discontinuities of the increment disks 7 and 8 form groups, each group having the same number of discontinuities.

In the case, for instance, of 50 discontinuities n, each group has, for instance, five discontinuities.

A timer, preferably the piezoelectric quartz contained with microcomputer 1 supplies an actual time signal.

By means of the pulses n produced by the wheel sensor 7 as a function of the discontinuities, the actual time signals are entered into the random-access memory 3 as a function of the front flank of the corresponding pulse. The random-access memory 3 of the microcomputer 1 has as many register locations i as there are groups i of discontinuities which have been selected. In order to be able better to utilize the storage capacity of the random-access memory 3, the frequency of the piezoelectric quartz can be reduced.

Figure 2:
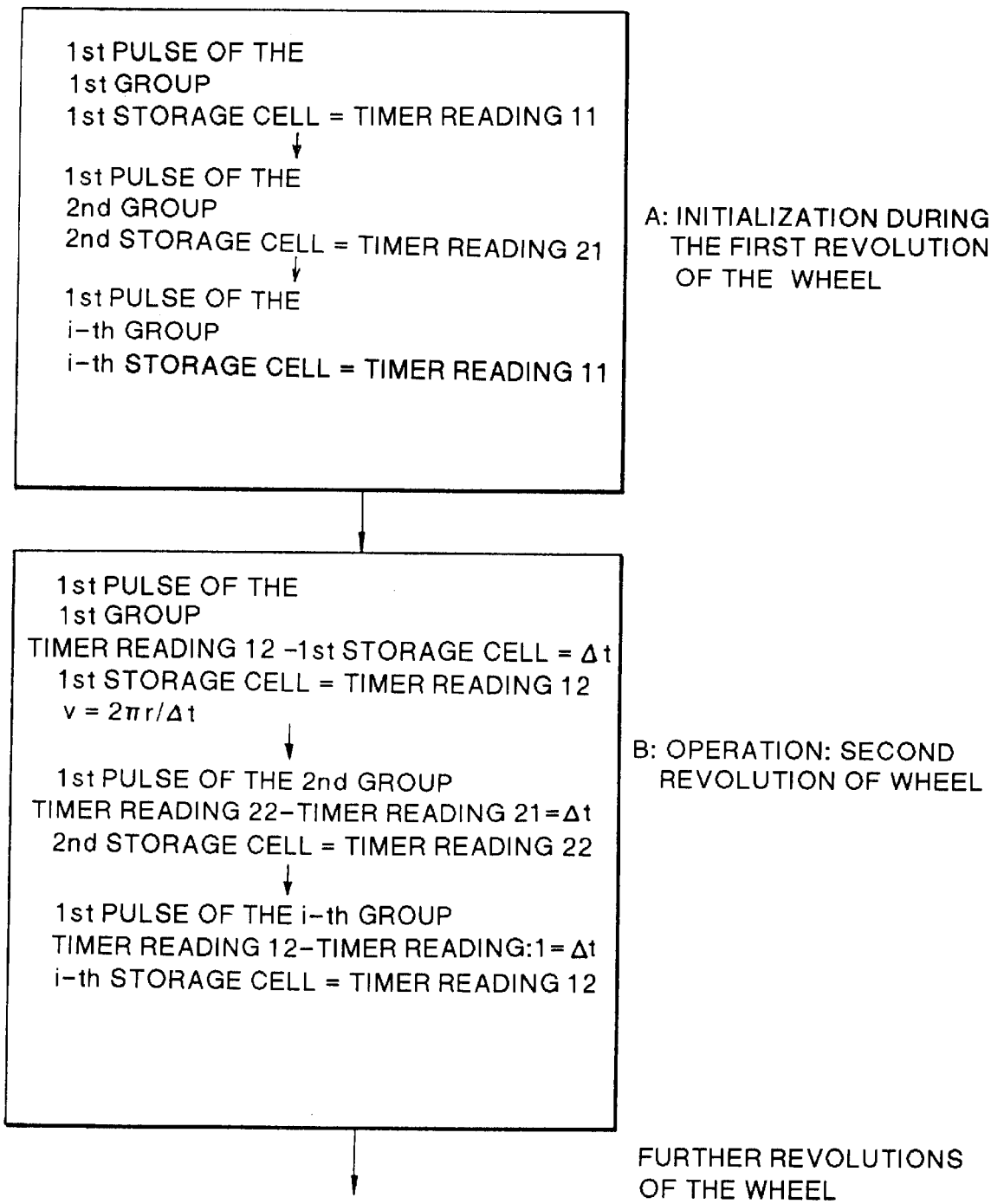
FIG. 2 shows a program for the determination of the wheel speed.

The method of the invention for determining the wheel speed will be now explained with reference to FIG. 2:

In an initialization phase 11 (wherein the first digit is the group number, and the second digit is the number of the revolution of the wheel), which takes place during the first revolution of the wheel, the actual reading 11 of the timer is entered, after occurrence of the first pulse of the first group of discontinuities, into the first register of the memory 4 of the microprocessor. Upon the occurrence of the first pulse of the second group of discontinuities, the actual time reading 21 at this time is stored in the second register of the memory 4.

This takes place in analogous manner for each first pulse of the corresponding group. Upon the first pulse of the i-th group, the existing timer reading i is stored in the i-th register of the memory 4. The initialization is concluded upon one revolution of the wheel.

During the normal operating condition, which follows the first revolution of the wheel, the speed of the wheel is determined as follows.

Upon the occurrence of the pulse of the first group of discontinuities, during the second revolution of the wheel at this time, the stored timer reading 11 is deducted from the actual timer reading 12 at this time and the wheel speed v is determined by means of this difference $\Delta t$, $$v = 2\pi r/\Delta t,$$

r being the radius of the wheel.

The timer reading 11 is erased and the actual timer reading 12 is entered into the first register of the memory.

Upon the application of the first pulse of the second group of discontinuities, the stored timer reading 21 is deducted from the actual timer reading 22 and the instantaneous speed of the wheel is determined, as described, with the aid of this difference. The timer reading 21 is written over by the timer reading 22.

This takes place for each first pulse of each further group of discontinuities until the second revolution of the wheel has been completed.

The formation of the difference which has been described takes place now every five pulses by comparison of, in each case, the timer reading actually present with the timer reading stored in the corresponding register. By this procedure, a very rapid determination of the speed of the wheel is possible.

The procedure described is repeated upon each revolution of the wheel, the timer reading stored from the preceding revolution of the wheel being deducted in each case from the timer reading of each group actually present.

We claim:

1. A method for the exact determination of the speed of a rotating part, suitable for determining the speed of the wheel of a motor vehicle, comprising:

scanning discontinuities present on the circumference of the rotating part without contact with the rotating part, there being a predetermined number of said discontinuities located along said circumference;

upon the detection of individual ones of said discontinuities, producing respective electric pulses in correspondance with individual ones of said discontinuities;

counting a number of said pulses equal to said predetermined number, and determining a period of time within which the pulses of all said discontinuities of the rotating part are counted precisely once;

recording the time of reception for each of various ones of said pulses resulting from corresponding ones of said discontinuities arranged about said circumference during one complete revolution of said rotating part;

recording the times of reception for respective ones of said various pulses during a further revolution of said rotating part; and computing the speed of the rotating part from said period of time by observing a difference in time of reception of one of said various pulses corresponding to a specific one of said discontinuities during said one revolution and the time of reception of the pulse produced by said specific discontinuity during said further revolution.

2. A method according to claim 1, further comprising steps of arranging a succession of the pulses representing the discontinuities into a succession of groups and, upon the occurrence of a first pulse of each group, commencing a new time measurement by a counting of the pulses over all discontinuities.

3. A method according to claim 2, further comprising a step of combining the pulses representing the discontinuities into groups of the same number of pulses.

4. A method according to claim 2, wherein said recording steps include:

storing a first time information upon the occurrence of the pulse of the first discontinuity of each group;

determining a second time information upon a repeated occurrence of the pulse of the first discontinuity of each group; and said computing step includes comparing the second time information with the first time information; and determining, from a difference between the two time informations, the speed of the rotating part.

5. A method according to claim 4, wherein upon the occurrence of the second time information, there is an erasing of the first time information and said storing of the second time information.

6. A system for the exact determination of the speed of a rotating part, suitable for determining the speed of the wheel of a motor vehicle, wherein the system comprises a plurality of incremental transmitters associated with respective ones of at least two wheels of the motor vehicle, and a plurality of sensors located opposite respective ones of the incremental transmitters at respective ones of the wheels, the sensors detecting the signals corresponding to the speeds of the respective wheels; and a counter, and a control device of a motor vehicle, the control device having a memory comprising a plurality of registers; and wherein each of the sensors is connected to the control device of the motor vehicle, and registers of the plurality of registers are controlled by a signal of the counter;

the system provides for scanning discontinuities present on the circumference of the rotating part by respective ones of said transmitters and said sensors without contact with the rotating part, there being a predetermined number of said discontinuities located along said circumference;

wherein upon the detection of individual ones of said discontinuities, the system produces respective electric pulses by the respective one of said sensors for the respective rotating part in correspondence with individual ones of said discontinuities, and counts, by means of said counter, a number of the pulses equal to said predetermined number, and determines by means of the control device a period of time within which the pulses of all the discontinuities of the rotating part are counted precisely once; and wherein the system provides for recording by means of said registers the time of reception for each of various ones of said pulses resulting from corresponding ones of said discontinuities arranged about said circumference during one complete revolution of said rotating part;

wherein the system provides further for recording the times of reception for respective ones of said various pulses during a further revolution of said rotating part; and wherein the system computes the speed of the rotating part from said period of time by observing a difference in time of reception of one of said various pulses corresponding to a specific one of said discontinuities during said one revolution and the time of reception of the pulse produced by said specific discontinuity during said second revolution.

7. A system according to claim 6, wherein the incremental transmitters are arranged at respective ones of the wheels of the vehicle; and the control device determines the wheel speeds for all wheels.

8. A system according to claim 6, wherein the sensors are Hall sensors.

9. A system according to claim 6, wherein the sensors are ABS sensors.

10. A system according to claim 7, wherein the sensors are ABS sensors.

* * * * *